PORTABLE STAPLER WITH PNEUMATIC DRIVE AND RETURN
Original Filed April 27, 1959 2 Sheets-Sheet 1
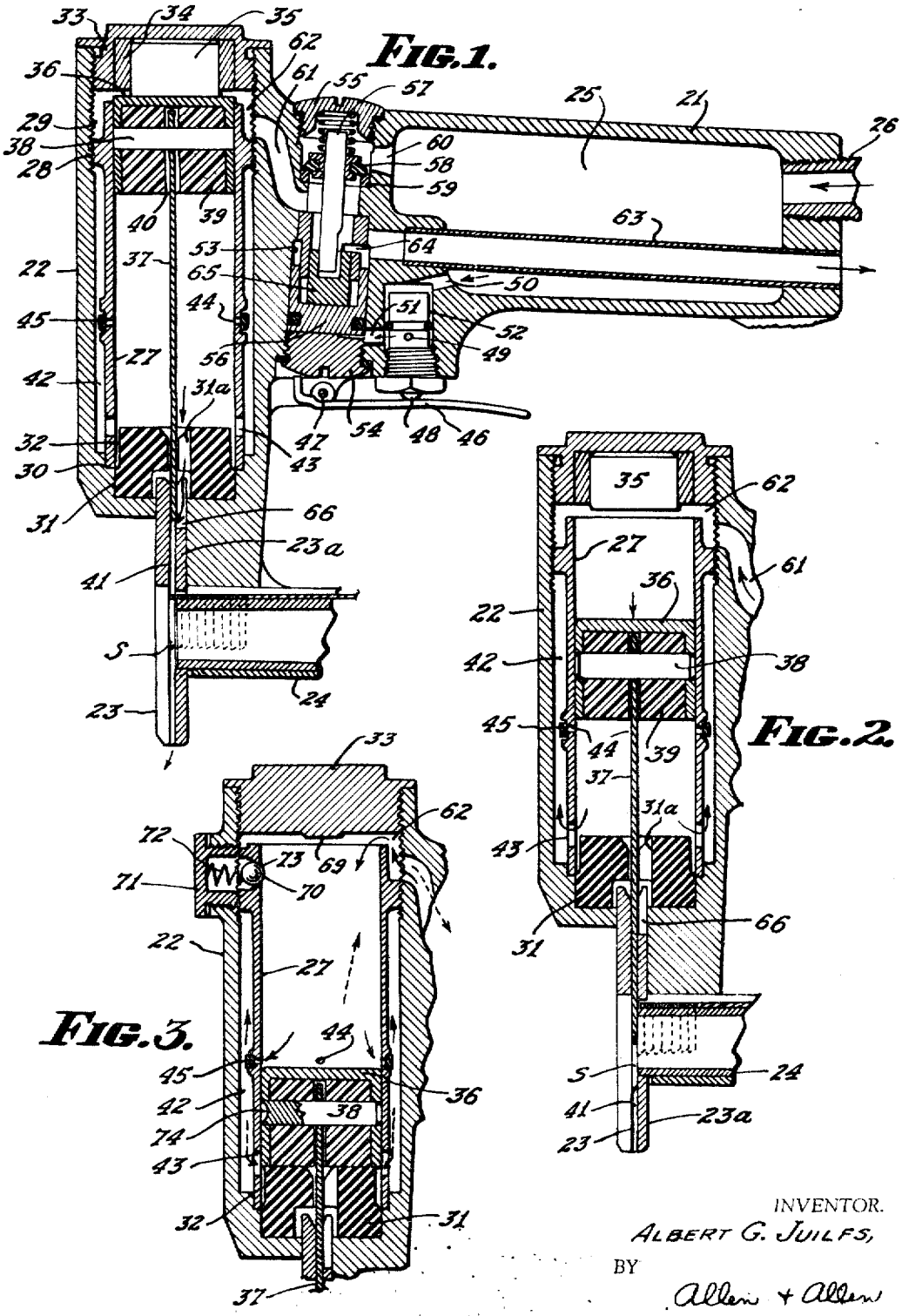
INVENTOR.
ALBERT G. JUILFS,
BY
Allen + Allen
ATTORNEYS.

PORTABLE STAPLER WITH PNEUMATIC DRIVE AND RETURN

Original Filed April 27, 1959 2 Sheets-Sheet 1

INVENTOR.
ALBERT G. JUILFS,
BY
Allen & Allen
ATTORNEYS.

United States Patent Office

Re. 26,262
Reissued Sept. 5, 1967

26,262

PORTABLE STAPLER WITH PNEUMATIC DRIVE AND RETURN

Albert G. Juilfs, Anderson Township, Hamilton County, Ohio, assignor to Senco Products, Inc., Fairfax, Ohio, a corporation of Ohio Original No. 2,983,922, dated May 16, 1961, Ser. No. 809,129, Apr. 27, 1959. Application for reissue Mar. 24, 1966, Ser. No. 544,639
19 Claims. (Cl. 227—130)

Figure 12:
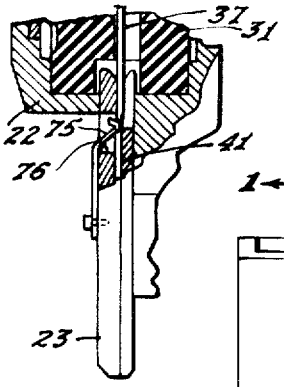

Matter enclosed in heavy brackets [ ] appears in the original patent but forms no part of this reissue specification; matter printed in italics indicates the additions made by reissue.

This invention resides in the provision of a power operated device in which fluid power is used both to actuate a piston on a work performing stroke and also to return the piston in preparation for a succeeding stroke, all with a minimum use of fluid power, means other than fluid power being used to hold the piston in pre-work stroke position.

An important object of this invention is to provide a stapler in which air is utilized both to drive a piston from an initial position for a drive stroke and to effect return of the piston substantially to its initial position, whereafter the piston will be held in such initial position by means other than air and the air will not be used to maintain the driver in such initial position.

Another important object of this invention is to provide a portable stapler with means for storing air as the staple driver and its actuating piston move in a staple driving direction in such a manner that the air thus stored on the driving stroke may be used to aid return of the driver and piston for the next driving stroke.

A further object of this invention is to provide a portable stapler which uses a minimum amount of air even though the driver actuating piston is both driven and returned by air.

A very important object of this invention is to provide an air operated device in which a piston is both driven and returned by air without the need for or use of a return spring for the piston.

Another important object of this invention is to provide an air operated device in which a piston is reciprocated in a cylinder by air pressure alone and wherein the length of the cylinder is kept to a minimum.

A specific object of this invention is to provide a portable penumatic stapler in which a piston and driver are air actuated to drive a staple and in which the driver and piston are returned without a driver return spring, all with the use of a minimum amount of air.

Another specific object of this invention is to provide a portable pneumatic stapler in which the height of the stapler (the distance from the tip of the staple discharge nose to the top of the cylinder) is equal to or less than that of comparable staplers in which a spring is used to return the piston and driver, and in which this stapler height is markedly less than that of other comparable staplers in which the piston and driver are returned by air.

A very important object of this invention is to provide a relatively small portable pneumatic stapler which may be used on production line work to do the same jobs now performed by larger tools, which novel small stapler is substantially trouble free and extremely economical to operate.

These and other objects of this invention will become apparent to those skilled in the art from a reading of the description to follow and from an examination of the accompanying drawings, in which drawings like numerals are employed to designate like ports throughout and in which the invention, for purposes of illustration, is shown as applied to a portable pneumatic stapler.

Figure 4:
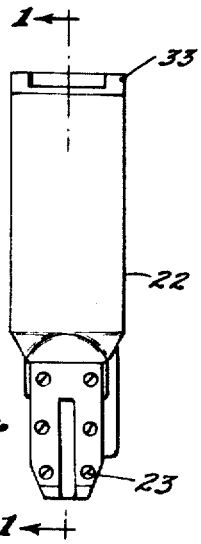
Figure 6:
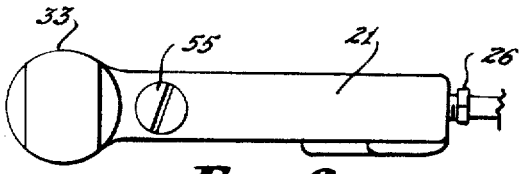
Figure 5:
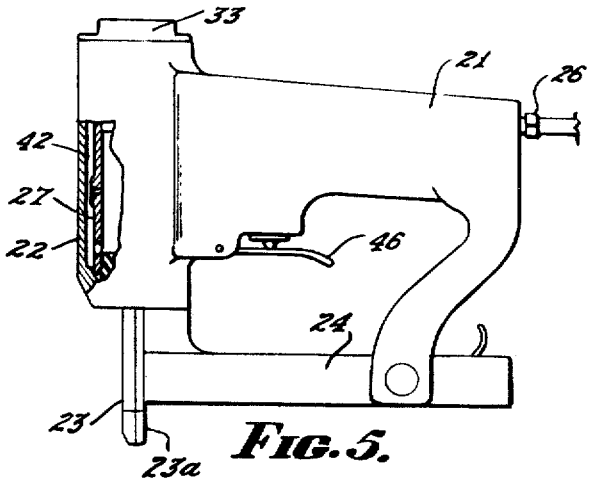
Figure 9:
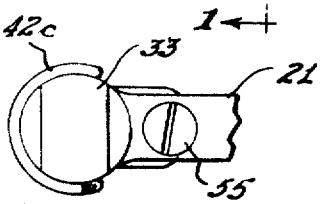
Figure 7:
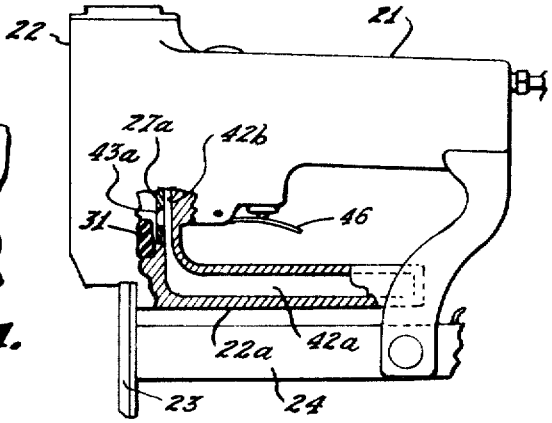
Figure 8:
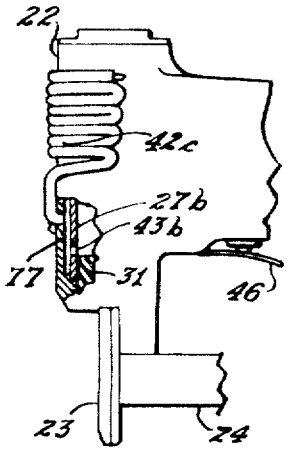
Figure 11:
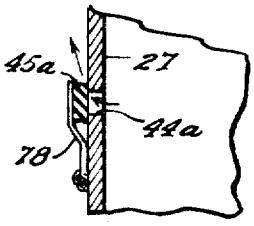
Figure 10:
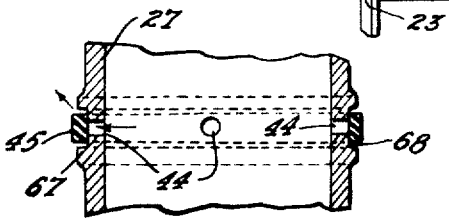

FIGURE 1 is a cross-sectional view of the stapler embodying this invention, the section being taken on the line 1—1 of FIGURE 4, FIGURE 2 is a fragmentary sectional view showing the position of certain of the driving mechanism during the driving stroke, FIGURE 3 is a further fragmentary cross-sectional view showing a different stage in the driving stroke and indicating also a possible modification, FIGURE 4 is a front view of the stapler embodying this invention, particularly as seen from the left hand side of FIGURE 5, FIGURE 5 is a side elevation, with parts broken away and parts in section, of the stapler embodying this invention, FIGURE 6 is a top view of the stapler shown in FIGURE 5, FIGURE 7 is a side elevation, with parts broken away and parts in section, of a modification of the invention, FIGURE 8 is a fragmentary side elevation, with parts broken away and parts in section, of another modification of this invention, FIGURE 9 is a fragmentary top view of the modification shown in FIGURE 8, FIGURE 10 is a fragmentary sectional view showing one of the forms of this invention, FIGURE 11 is a fragmentary sectional view showing another of the forms of this invention, and FIGURE 12 is a fragmentary sectional view showing a further modification of this invention.

Although the invention is herein shown and described as applied to portable pneumatic staplers, it is to be understood that in its broadest aspects the invention is not to be so limited except as particularly set forth in the claims appended hereto.

Broadly stated, this invention comprises driving a piston by fluid power from a retracted position within a cylinder to a piston travel limiting means, returning the piston to its retracted position by fluid power applied in the region of said travel limiting means, and releasably holding the piston in retracted position by means other than fluid power. This may be accomplished by using a source of fluid power to overcome the releasable holding means and to drive the piston from its retracted position to the travel limiting means, diverting the source of fluid power to return the piston to its retracted position while relieving the piston from the initial influence of the fluid power used on the drive stroke, and holding said piston in retracted position by said releasable means while relieving the piston from further influence by the fluid power used on the return stroke.

In order to minimize the fluid power diverted for the return stroke it is preferred to provide a reservoir or storage chamber into which fluid moved by the piston on its drive stroke is forced. The fluid power diverted for the return stroke is used to supplement that stored in the reservoir and thus only a very small amount of fluid need be so diverted. In this way fluid which in other arrangements is simply exhausted on the drive stroke of the piston is utilized to aid the return of the piston. And when the piston is returned, means other than fluid power are employed to hold the piston in retracted position, thus effecting a further saving in the fluid used.

Applying these principles to stapling, particularly to portable pneumatic staplers, a satisfactory stapler utilizing this invention comprises a cylinder in which a piston is reciprocable and a drive track in which a staple diver is reciprocable. The driver is attached to the piston. There are releasable holding means to hold the piston in a retracted position and a suitable stop or travel limiting means to which the piston is driven when the holding means is overcome. Conventional means are provided for placing a succession of staples in said drive track in position to be engaged by said driver and driven through said track into work when said piston moves on its drive stroke. The piston is moved on its drive stroke by air from a source of compressed air introduced in the region of said releasable holding means. After said piston is thus driven to its said stop compressed air is no longer introduced in the region of said releasable holding means. The region of the cylinder above the piston is open to exhaust and compressed air is introduced below said piston in the region of said stop. This returns the piston to retracted position and engagement with said releasable holding means. In the retracted position of said piston the region of the cylinder below said piston is open to exhaust and compressed air is no longer introduced in the region of said stop.

Preferably there is a definite exhaust passage through which air may pass from beneath the piston when the piston is in its retracted position. In the preferred form of the invention a storage chamber or reservoir is provided and this reservoir communicates with that end of the cylinder in which the stop is located. Immediately after the piston is moved from its releasable holding means the exhaust passage is closed. Air moved by the piston on its drive stroke is thus forced into the reservoir rather than exhausted. Also preferably, upon the piston reaching its stop a small amount of compressed air is added to that stored in the reservoir. When the air above the piston is opened to exhaust, the compressed air in the reservoir is sufficient to return the piston. When the piston is returned the exhaust passage is opened and compressed air is no longer introduced in the reservoir. Air remaining in the reservoir and lower part of the cylinder exhausts through said passage. The piston is held by the releasable holding means until air is again introduced in the region of said holding means to initiate another cycle.

Before proceeding with a more detailed description of the invention a few observations are in order. It would be possible to eliminate the exhaust passage as such, primarily under two conditions. One, if the lower end of the cylinder and drive track in the region of the stop were made with "sloppy" clearances, the stapler would operate satisfactorily although less air would be stored and more would be wasted. Two, if the lower end of the cylinder and drive track in the region of the stop were made relatively tight, the stapler would operate fairly satisfactorily if not fired too rapidly; with no exhaust passage and a "tight" fit there would be a gradual build up of air which would eventually prevent proper staple driving, unless operation was slow enough to permit adequate leakage. Also, the reservoir as such—in the invention as broadly considered—could be eliminated and compressed air introduced directly under the piston when at its stop, although this would result in greater air loss.

Referring now [particular] *particularly* to FIGURE 1 of the drawings the stapler is illustrated as including a handle section 21, a main body 22 and a nose section 23. A portion of the means for feeding a succession of staples into the nose section 23 is generally indicated at 24. The staple feed means is conventional and does not form a part of this invention; there are several satisfactory staple feed means available for this purpose.

The handle 21 includes a large air chamber 25 and a conventional connection 26 to a suitable supply of air under pressure.

Fixed within the main body 22 is, in this form of the invention, a sleeve 27 which has a threaded portion 28 near its upper end which engages the internal threads 29 at the upper end of the body section 22. The sleeve 27 is screwed into the body section 22 until the lower end comes to rest on the shoulder 30 provided in the lower end of the main body section 22. Mounted in the lower end of this main body section 22 is a resilient bumper 31 which is relieved about its periphery as indicated at 32. The upper end of the main body section 22 is closed by a cap 33 having suitable threads to engage the threads 29. The cap 33 has a sleeve 34 fixed thereto and within this sleeve there is secured a magnet 35. Preferably the magnet 35 extends slightly below the lower edge of the cap 33 and particularly of the sleeve 34.

Slidably mounted within the cylinder sleeve 27 is a metal piston 36 to which is firmly secured a staple driver 37. Preferably the driver 37 is connected to the piston 36 by means of a pin 38. Also it is preferred that the piston 36 be cup-shaped and filled with a hard, tough but light and resilient material 39. This material is relieved at 40 so that the driver may have some lateral movement or wobble on the pin 38.

This lateral movement insures that the driver 37 will not bind in the drive track 41 provided in the nose section 23.

In the form of the invention illustrated in FIGURE 1 there is an air storage chamber 42 defined by the cylinder sleeve 27 and main body section 22. Ports 43 in the lower end of the sleeve 27 communicate with this chamber 42. These ports are open. Also located in the sleeve 27 are one or more other ports 44 which are normally closed by resilient means 45. Each of these ports 44–45, therefore, constitutes a one-way or non-return valve.

The piston 36 and pinned driver 37 are actuated by air which is controlled by valve means now to be described. The particular valve means shown are the subject matter of another application for patent filed by this inventor of even date herewith and entitled "Remote Control Air Valves," Serial No. 819,387. Insofar as the instant invention is concerned this particular valve mechanism is not critical. Any workable valve mechanism which will introduce air under pressure about the piston 36 will suffice. For the sake of completeness, however, a brief description of the valve mechanism shown follows. It is to be understood—and emphasized—however, that the instant invention—the subject matter of this application—is directed to the means for returning the piston and driver by air and maintaining them in proper pre-drive position by means other than air.

A trigger 46 is hingedly fixed to the stapler as indicated at 47. This trigger normally lies adjacent a valve button 48. The button 48 is normally spring biased to a position in which it prevents air from passing through the orifice 49 to the passage 51. There is a passage 50 leading from the chamber 25 to the remote control valve chamber 52.

Also in the handle of the gun is a firing valve cylinder 53 and a pair of closure plugs 54 and 55. A trigger piston 56 is slidable in the valve cylinder 53. The plug 54 is relieved so that air which eventually comes through the passage 51 will get into position behind the piston 56 and drive it upwardly as viewed in FIGURE 1. Also within the firing valve 53 is an elongated valve stem 57 having fixed thereto a valve member 58 adapted to seat on the valve seat 59. A passage 60 leads from the air chamber 25 to the upper region of the firing valve cylinder 53. A passage 61 leads from the central region of the firing valve cylinder 53 to an annular area or clearing 62 surrounding the upper part of the sleeve 27 and the piston 36. Since the diameter of the piston 36 is greater than that of the magnet 35, and since the magnet 35 extends beyond the sleeve 34 and upper cap member 33, air entering the area 62 may easily come into contact with the top of the piston 36 in order to start it on its driving stroke as will be described more fully shortly.

There is an exhaust tube 63 which extends through the handle 21 and chamber 25 thereof. This tube 63 communicates with an exhaust passage 64 leading from the central region of the firing valve cylinder 53. Nesting within the trigger piston 56 is a valve member 65.

It will be observed that normally there is a clearance between the lower end of the valve stem 57 and the bottom of a recess in the valve member 65 which is approximately equal to the width of the passage 64.

FIGURE 1 illustrates the position of the stapler and its components prior to the time the trigger 46 is actuated. In this position any air in the clearance 62 is open to exhaust through the passage 61, around the valve stem 57, through the passage 64 and out the end of the stapler handle through the tube 63. Air entering the stapler into the chamber 25 can go no further than the upper region of the firing valve cylinder 53, via the passage 60, since the valve seat 58 will be seated on the seat 59. The piston 36, and driver 37 which is pinned to it, will be maintained in the upper portion of the cylinder defined by the sleeve 27 by reason of the magnet 35.

Referring now particularly to the lower part of FIGURE 1 it will be observed that the nose structure 23a is provided with an orifice 66 which communicates with the drive track 41 ahead of the lower end of the staple driver 37 and with a suitable clearance or passage 31a in the bumper 31. Thus it will be observed that when the piston 36 is against the magnet 35 air below this piston, within the cylinder defined by the sleeve 27 is open to atmosphere through the passage 31a, orifice 66 and drive track 41. Any air within the storage chamber 42 is also free to exhaust through this same route.

The operation of the embodiment of the invention illustrated in FIGURE 1 is as follows. The operator will grasp the handle 21 and squeeze the trigger 46 thereby moving the valve button 48 so as to open the passage 49 and permit air within the chamber 25 to pass through the passage 50, orifice 49 and passage 51 to the clearance provided in the member 54 behind the trigger piston 56. The trigger piston 56 will rise, taking the valve button 65 with it. Initial movement of the button 65 serves to close the exhaust passage 64. Further movement of the piston 56 and button 65 will result in upward movement of the stem 57 and valve member 58. In this manner air is permitted to flow through the valve cage—the upper portion of the firing valve cylinder 53—with the result that air will pass from the chamber 25, through the passage 60, beneath the member 58 and around the stem 57, through the passage 61 to the clearance 62. This air flow is proportional to the movement of the trigger valve.

A delay is caused by the magnet which is holding the piston 36 in its up position. When sufficient pressure is obtained in the area 62 around the top of the piston 36 to overcome the power of the magnet, the main piston starts to descend. By this time the trigger valve is full open and the gun is operating on full pressure.

As the piston is driven downward, the driver 37 closes the exhaust port 66 in the nose member 23a which, with the member 23, defines the drive track 41, while the air which is under the piston 36 is forced through the lower ports 43 in the sleeve 27 and is slightly compressed in the storage chamber 42.

When the piston 36 reaches the end of its downward stroke, at which point it will abut the bumper 31, the ports or one-way valves 44–45 in the central part of the sleeve 27 will be forced open by the pressurized air on top of the piston. In this manner, additional air is compressed into the storage chamber 42. As seen in FIGURE 3 the valves 44–45 are preferably located so that they will be just above the piston 36 when it is at rest on the bumper 31.

It will be readily understood by those skilled in the art that as the piston 36 moves from its position adjacent the magnet 35 to the bumper 31, the driver 37 moved through the track 41, engaged a staple S positioned in the track by the feed means 24, and drove it through the end of the nose structure 23 into the work.

When the trigger 46 is released the spring biased valve button 48 will return to its closed position as indicated in FIGURE 1, whereupon air flow to the trigger piston 56 through the passages 50 and 51, and orifice 49, is shut off. The pressurized air under the trigger piston 56 is released back through the remote valve and exhausted through grooves in the housing of this valve. These grooves, not shown, communicate with the passage 51 when the button 48 is in its released position and such grooves are blocked by this button when it is moved to actuate the firing valve. The detail of this is shown in my said copending application.

The valve member 58 then abuts against its seat 59 thereby shutting off air flow to the main bore—the upper part of the cylinder sleeve 27. The pressurized air which is in the cylinder above the piston 36 travels through the passage 61 and forces the valve button 65 down past the exhaust port 64 and thus is exhausted through this port and the tube 63.

As the pressurized air on top of the main piston is exhausted, the valves 44–45 on the central part of the cylinder sleeve 27 will close. The compressed air in the chamber 42 then expands through the lower ports 43 in the sleeve 27 and forces the piston 36 upwardly towards the magnet 35. When the main piston is almost at its upper position adjacent this magnet 35, the lower end of the driver 37 will open the exhaust port 66 which communicates with the drive track 41 and the compressed air under the piston 36 then exhausts. The momentum gained by the piston 36 from the expansion of the compressed air, coupled with the pull of the magnet, causes the piston 36 to return to its original position.

The positions of various of the stapler parts during the above described cycle of operation are shown in further detail in FIGURES 2 and 3. In FIGURE [3] *2* the parts are shown during an intermediate stage in the driving stroke of the piston 36 and driver 37. It will be understood that air is coming through the passage 61, as indicated by the arrow in this figure, and having built up in the clearance 62 sufficient to start the piston 36 on its downward stroke and move it from the magnet 35, it is now acting full force behind the piston 36 during this driving stroke. The staple driver 37 has moved sufficiently far to block the orifice 66 leading to the track 41 and has engaged a staple S and started to move it through this track in the nose members 23–23a. Air beneath the piston 36, which cannot escape through the track 41 at this time, is forced through the ports 43 into the storage chamber 42 and this is also indicated by arrows in this figure.

Although FIGURE 3 also shows a modification of the invention, which will be described, it does show the position of the main driving components at the time the piston 36 and driver 37 have reached the end of their driving stroke. In this position the piston 36 has seated against its stop 31 and has cleared the valve-ports 44. These ports are normally closed by resilient member 45. When the piston 36 has reached the position of FIGURE 3 the air pressure above this piston is sufficient to move the resilient member 45 so as to open the ports 44 whereupon additional air is compressed in the chamber 42. FIGURE 3 also illustrates certain of the purposes of the clearance 32, or relief, given the stop 31. It will be observed that the ports 43 are located so as to communicate with this clearance area. The piston 36 has a greater diameter than the relieved portion 32 of the stop 31. Thus, upon return of the piston 36 as above described, it will be seen that such return is aided by reason of the fact that the air compressed within the chamber 42 has an opportunity to act on the lower side of the piston 36 which extends beyond the relieved bumper 31.

In FIGURE 10 I have shown the arrangement of the valve ports 44 and resilient closure 45 in greater detail. In this figure it will be observed that there are four ports 44 located in a row in the wall of the sleeve 27. A bead 67 is provided in the region of these ports on the outside of the sleeve 27. A groove 68 is provided in this bead or enlarged portion of the sleeve 27 and a band of resilient material 45 is located in this groove 68. The material 45 is selected so that the air pressure is sufficient to move the material in the groove so as to pass through the port 44 into the chamber 42 in the manner described.

It will be apparent that modifications may be made in this invention without departing from its scope and spirit. Some of these modifications, by way of example, are disclosed herein.

Referring now particularly to FIGURE 3, there is illustrated another means for maintaining the piston 36 in its up position, this other means to replace the magnet 35 described in connection with the embodiment of FIGURE 1. Preferably the cap 33 has been enlarged and provided with a small projection 69 against which the piston 36 will abut in its up position. This will insure that air from the area 62 will reach the top side of this piston. The piston holding means comprises a ball detent 70 spring biased within a plug 71 screwed into the main body 22. The ball 70 is urged towards the interior of the cylinder sleeve 27 by the spring 72 and is restricted by the opening 73 which is somewhat smaller than the diameter of the ball 70.

The detent means just described is located so as to register with the pin 38 by means of which the driver is held to the piston. Thus when the piston 36 has been moved against the projection 69 the detent ball 70 will be in alignment with the pin 38. One end of this pin is dished as indicated at 74 so that the ball 70 may be forced into engagement with the dished end of the pin whereby to maintain the piston 36 in its up position. When sufficient air pressure has built up on top of the piston to overcome the spring 72, the ball 70 will retract as the piston starts its driving stroke. When the stored and compressed air from the chamber 42 drives the piston to the projection 69 the detent ball 70 will engage the end 74 of the pin 38 and hold the piston 36 in position while the air beneath the piston is free to exhaust through the orifice 66 and drive track 41 as before.

Referring now particularly to FIGURE 12 there is illustrated yet another means for holding the piston in its up position. In this arrangement there is provided a spring clip 75 which extends through an orifice 76 in the nose member 23 and into the drive track 41. The clip is so positioned that when the stored and compressed air from the chamber 42 returns the piston 36 to its up position, the clip will project into the drive track 41 beneath the lower end of the driver 37 and thus maintain the driver and piston in such up position. Again, when the air pressure above the piston 36 builds up sufficiently to overcome the spring clip 75 it will be forced out of the track 41 into the orifice [75] *76* and the piston and driver will complete the driving stroke through the track 41.

It will be apparent to those skilled in the art that releasable means other than the magnet 35, detent 70 or clip 75 (for example, a suction cup) may be used to hold the piston 36 in its up position without the use of compressed air for this purpose. The elimination of air for this purpose is a very important feature of the invention. Those staplers which depend on compressed air to maintain the piston 36 in the up position consume a great deal of air and are not economical to operate. In the preferred arrangement of this invention a small amount of air is stored (in other known tools this air is exhausted, wasted) and compressed and then used to aid return of the piston to its home position at the top of the cylinder. Upon reaching this position, however, releasable mechanical means are employed to hold it in position until another drive stroke is initiated. During such holding time no air is required and in this manner a big saving in the economics of stapler operation has been accomplished.

Another important advantage of the present invention is the elimination of return springs for the driver and/or piston. By returning the piston to home position by air, a return spring has been eliminated. Return springs in the past have eventually always caused some trouble and it is a distinct advantage to be able to eliminate them. In this invention not only is the return spring eliminated and the driver and piston returned by air, but also a great saving in the amount of air needed has been effected by the novel arrangement of storing and compressing a relatively small amount of air, which would otherwise be wasted anyway, and which small amount of air has only to return the piston to home position whereafter the piston will be maintained by means other than air.

It should be emphasized that the elimination of the return spring has at least one other important advantage. Those staplers which use piston-driver return springs must provide space or room for collapse of the spring on the drive stroke. This usually requires a stapler having a longer cylinder. This means the height, i.e., the distance from the tip of the staple discharge nose 23 to the top of the housing 22, of the stapler must be increased. A larger tool results—one which is heavier, harder to manipulate and requires more air to operate.

An even more striking comparison illustrating advantages of the [intsant] *instant* invention takes place when one compares the air return tool of this invention with those heretofore known. The prior art air return tools utilize two pistons and require, in effect, a cylinder for each. The tool of this invention, therefore, which tool uses one piston and one cylinder—and no return spring—obtains the same or equivalent operative drive stroke for the piston in a cylinder about one-half the length required by these other "two piston" air return staplers. Thus a smaller tool capable of accomplishing the same jobs as these other larger tools is achieved by this invention. This means a saving in material of manufacture, air for operation, and a tool which is easier to handle.

The specific, preferred form of the invention has been described as including a storage area or reservoir. In FIGURE 1 this is illustrated at 42 and is defined as the area between the main body 22 and cylinder sleeve 27. This has been found to be a very satisfactory arrangement but it is not the only one possible. It will be apparent to those skilled in the art that this storage chamber may take other forms and be located in other places. Examples of this are illustrated and will now be described.

Referring now particularly to FIGURE 7 the storage chamber 42a has been placed, for convenience, immediately above the staple feed mechanism 24. In this embodiment of the invention there is a cylinder 27a in which the piston and driver reciprocate. This cylinder 27a has a port 43a located adjacent the top of the bumper 31 and communicating with the chamber 42a, which chamber may be formed as part 22a of the main body or housing 22. It will be understood that the chamber 42a may be extended as indicated at 42b to a position wherein another one-way valve port 44–45 may be located in the cylinder 27a and through which air under pressure may pass when the piston 36 seats on the stop 31, as described in connection with FIGURE 1. Thus, as before, as the driver and piston move on the driving stroke air will be forced into the chamber 42a from the cylinder 27a through the orifice 43a. When the piston seats on the stop 31, additional air under pressure may pass into the chamber 42a via the passage 42b which communicates with one or more ports 44–45 as earlier described.

In the arrangement of FIGURE 7 it will be understood that the air stored and compressed into the chamber 42a will be sufficient to return the driver and piston to the up position, whereafter the lower part of the cylinder will again be open to atmosphere and mechanical means such as the magnet of FIGURE 1, the detent of FIGURE 3 or the clip of FIGURE 12 will maintain the piston in such up position until another drive stroke is commenced.

In FIGURES 8 and 9 yet another manner of locating the air chamber is illustrated. In these figures the chamber is shown as comprising a tube 42c fixed to the outside of the main body 22. The cylinder in which the piston reciprocates is indicated at 27b and the stop for the piston is indicated at 31. The lower end of the storage tube 42c communicates with a passage 77 which passage in turn is open to the orifice 43b in the cylinder wall 27b. Again it will be understood that the passage 77 extends to a position so that it communicates with a valve port 44–45 located in the cylinder wall 27b so as to be just above the top of the piston 36 when it is seated on the stop 31. In this manner additional air under pressure moves into the reservoir tube 42c via the non-return valve 44–45 and the passage 77. The operation is as before; on the drive stroke of the piston and driver air beneath the piston is forced into the storage tube 42c through the orifice 43b and passage 77. When the piston seats on the stop 31 additional air under pressure enters the tube 42c through one or more valve ports 44–45 communicating with the passage 77. In all of these arrangements, illustrating preferred forms of the invention, the lower end of the stapler will be closed to atmosphere immediately after the piston commences its drive stroke, and will be open to atmosphere when the piston is returned to its retracted position adjacent the cap 33 by the relatively small amount of stored and compressed air within the particular storage chamber involved.

Thus far, in describing the preferred forms of this invention, the passage or orifice 66, which connects a definite clearance 31a in the travel limiting means 31 with the drive track 41, has been included. It is this orifice which the driver 37, when the piston 36 moves from the releasable holding means, closes, thereby insuring that most of the air moved by the piston on its drive stroke will be forced into the reservoir rather than exhausted. And when the piston returns to retracted position the driver will open this exhaust means. There will, however, always be some leakage through the areas in which the driver reciprocates because the tolerances can't be held close enough to prevent such leakage and not unduly impede the driver. It should here be mentioned, therefore, that it would be possible to eliminate the passage 31a, 66 as such and still obtain an operable tool. This would be done by making the clearances for the driver through the lower stapler elements—primarily the stop 31 and nose 23—generous or "sloppy." This would result in more of the air being exhausted—and less of the air being forced into the reservoir—on the drive stroke of the piston. Once the piston were seated on its stop, however, the piston would substantially block further exhaust and compressed air could be admitted to the reservoir. Upon release of air above the piston the air within the reservoir would return the piston as before—except with a greater expenditure of air.

Also, it would be possible not only to eliminate the passage 31a, 66 but also to make the tolerances as close as possible, thus reducing exhaust at all times to a minimum. This would result in more air being forced into the reservoir but it would lead to an undesirable build-up of air in the lower part of the stapler if the stapler were fired rapidly. Thus, on attempted rapid fire under these conditions, the air, having no definite exhaust passage through which to exit and the clearances being relatively "tight," would accumulate in the lower part of the stapler and eventually prevent or impede proper staple driving. (If the stapler were operated slowly, giving the air opportunity to leak out in spite of the tight fit, then staples could be driven even with the arrangement as described; this would not ordinarily be commercially feasible.) Thus, it is desirable that there be some exhaust during such time as the piston is in its retracted position for this insures that air will not build up unduly in the lower part of the cylinder, nor prematurely in the reservoir between each drive stroke of the piston.

The preferred form of the invention, therefore, envisions and embraces an arrangement wherein there is a definite exhaust passage which closes shortly after the drive stroke begins and opens shortly before the piston reaches its retracted position, the clearances for the driver being otherwise relatively tight. In its broader aspects, however, deviations from this preferred arrangement, as above indicated, are permissible.

In FIGURE 11 there is illustrated another embodiment of a suitable valve means by which compressed air may reach a storage chamber. In this embodiment there is preferably a single orifice 44a which is normally closed by a valve member 45a made of resilient material and mounted on a spring 78 which urges it to close the orifice 44a. If desired additional orifices of this type may be provided. The orifice 44a is located in the cylinder wall 27 so that when the piston 36 is on its stop 31 air under pressure on top of the piston may force its way into the storage chamber by passing through the orifice 44a, the air pressure being sufficient to overcome the spring 78. This, of course, is but another example of a suitable non-return or one-way valve which may be used in the practice of this invention.

The preferred forms of this invention have so far been described, in considering the drawings, as including a storage chamber or reservoir. It has been pointed out that this reservoir may take different forms and be located in different positions on the stapler. There has also been described an arrangement in which, because of "sloppy" clearances—intentionally or unintentionally provided—very little air will be forced into the reservoir on the drive stroke of the piston, although once the piston is seated compressed air enters the reservoir sufficient to return the piston when the air above it is released. It is possible, therefore, to eliminate a reservoir into which air is forced on the drive stroke of the piston, and still retain some of the advantages of this invention as broadly considered. Considering FIGURE 3, for example, all that would be needed would be a one-way valve for the port or orifice 43 to prevent passage of air on the drive stroke of the piston, some exhaust means for escape from the stapler of air moved by the piston on the drive stroke, a connection between the orifice 43 and a source of compressed air, and valve or timing means to cause compressed air to enter beneath said piston when on its stop, such air passing through the orifice 43 and one-way valve provided for it; upon reaching its retracted position the piston would again be engaged by releasable holding means and air under the piston would be released. Such an arrangement, although using more air than the preferred forms, would still retain such advantages as reduced stapler height and ease of handling.

In its broadest aspects, therefore, this invention may be considered as involving the combination of: releasable holding means, other than fluid power, to hold the piston in retracted position; fluid power to overcome the releasable holding means and drive the piston to a piston stop; means to release the fluid power used to drive the piston to its stop; fluid power operable beneath said piston to return said piston to said releasable holding means when said first mentioned fluid power is released; and means to release said last mentioned fluid power at about the time said piston is engaged by said releasable holding means.

In its more specific, but still somewhat broad aspects, the invention resides in the provision of a pneumatic stapler including a piston and [driver] *driver;* releasable holding means, other than air, for holding the piston in a retracted position; means to introduce compressed air so as to overcome said holding means and drive said piston to a piston stop; a reservoir into which air is moved by said piston as it makes its drive stroke; means to introduce additional—and compressed—air into said reservoir; means to release the air above said piston so that the air in said reservoir will return the piston to its retracted position and re-engagement with the holding means; and means to exhaust the air beneath said piston in retracted position; said exhaust means being opened immediately before completing a return stroke. The form and location of the reservoir may vary. The releasable holding means may vary. The type of exhaust means may vary. The manner of introducing additional, compressed air into the reservoir may vary. All of this has been described above.

It is believed that the operation of the stapler of this invention has been sufficiently described in the above passages. Although the invention has been described in connection with certain particular embodiments and structures, it is to be understood that the invention is not limited to these particular embodiments and structures except insofar as they are specifically set forth in the subjoined claims.

Having thus described the invention, what is claimed as new and what is desired to be protected by United States Letters Patent is:

1. In a pneumatic stapling tool having a cylinder provided with a head, means for admitting air under pressure from a source of compressed air to said cylinder, a piston in said cylinder and a driver arranged to be actuated by said piston to travel in a driver slot to drive a staple, and means to place a succession of staples in said driver slot to be driven by said driver; the improvement which comprises: releasable means operative independent of air pressure for normally holding said piston in retracted position with a portion, at least, of the head of said piston exposed to compressed air admitted to said cylinder, and means to limit the travel of said piston in a staple driving direction; a port in said cylinder adjacent said travel limiting means and disposed just below the lower surface of said piston when said piston has abutted said travel limiting means, a reservoir connected to said port so as to receive air moved by said piston when said piston is moved from its retracted position to said travel limiting means, means to admit compressed air into said reservoir only after said piston abuts said travel limiting means, and a clearance through said cylinder for air moved by said piston in traveling from its said retracted position to said travel limiting means, said piston substantially closing said clearance when said piston abuts said travel limiting means; whereby when compressed air is admitted to said cylinder said piston and driver are caused to move in a staple driving direction, and whereby when said piston abuts said travel limiting means and closes said clearance, compressed air is admitted into said reservoir and is caused to act upon the lower surface of said piston via said first mentioned port, whereby when compressed air is no longer admitted to said cylinder, the air under pressure in said reservoir causes said piston to return to retracted position where it is held independent of air pressure by said releasable means, excess air in said reservoir and said cylinder exhausting through said first mentioned port and said clearance, said clearance being more restricted than said first mentioned port whereby air moved by said piston, when said piston moves from its said retracted position to said travel limiting means, passes through said first mentioned port into said reservoir.

2. The improvement of claim 1 in which the said compressed air admitted to said reservoir after said piston abuts said travel limiting means is the compressed air in said cylinder.

3. The stapling tool of claim 1 including means to substantially close said clearance immediately after said piston moves from its said retracted position.

4. The stapling tool of claim 1 in which said clearance constitutes a passage which is through said travel limiting means to said driver slot just beyond the end of said driver when said piston and driver are in retracted position, said passage being larger than required to accommodate said driver, said driver substantially blocking movement of air from said passage to said slot after said piston and driver move from said retracted position.

5. In a pneumatic stapling tool having a cylinder provided with a head, means for admitting air under pressure from a source of compressed air to said cylinder, a piston in said cylinder and a driver arranged to be actuated by said piston to travel in a driver slot to drive a staple, and means to place a succession of staples in said driver slot to be driven by said driver; the improvement which comprises: a magnet operative independent of air pressure for normally holding said piston in retracted position with a portion, at least, of the head of said piston exposed to compressed air admitted to said cylinder, and means to limit the travel of said piston in a staple driving direction; a port in said cylinder adjacent said travel limiting means and disposed just below the lower surface of said piston when said piston has abutted said travel limiting means, a reservoir connected to said port, means to admit compressed air into said reservoir only after said piston abuts said travel limiting means, and a passage through said cylinder for air moved by said piston in traveling from its said retracted position to said travel limiting means, said piston substantially closing said passage when said piston abuts said travel limiting means; whereby when compressed air is admitted to said cylinder said piston and driver are caused to move in a staple driving direction, and whereby when said piston abuts said travel limiting means and closes said passage, compressed air is admitted into said reservoir and is caused to act upon the lower surface of said piston via said first mentioned port, whereby when compressed air is no longer admitted to said cylinder, the air under pressure in said reservoir causes said piston to return to retracted position where it is held independent of air pressure by said *magnet* [releasable means], excess air in said reservoir exhausting through said first mentioned port and said passage.

6. In a pneumatic stapling tool having a cylinder provided with a head, means for admitting air under pressure from a source of compressed air to said cylinder, a piston in said cylinder and a driver arranged to be actuated by said piston to travel in a driver slot to drive a staple; the improvement which comprises: releasable means operative independent of air pressure for normally holding said piston in retracted position with a portion, at least, of the head of said piston exposed to compressed air admitted to said cylinder, means to limit the travel of said piston in a staple driving direction, a port in said cylinder adjacent said travel limiting means and disposed just below the lower surface of said piston when said piston has abutted said travel limiting means, a reservoir connected to said port whereby air below said piston is discharged into said reservoir during staple driving movement of said piston, a second port in said cylinder also communicating with said reservoir, said second port being disposed just above the head of said piston when said piston has abutted said travel limiting means; whereby upon admission of compressed air to said cylinder, said piston and driver are caused to move in a staple driving direction and the air below the piston is forced into said reservoir, until said piston abuts said travel limiting means and uncovers said second port, whereupon the air under pressure above said piston passes into said reservoir and is caused to act upon the lower surface of said piston, whereby when compressed air is no longer admitted to said cylinder and said cylinder is open to atmosphere, the air under pressure in said reservoir causes said piston to return to retracted position where it is held independent of air pressure by said releasable means.

7. In a portable pneumatic stapler comprising a cylinder, a piston reciprocable in said cylinder between a home position and a driven position, a driver connected to said piston, a drive track in which said driver reciprocates, means to feed a succession of staples into said drive track in position to be driven by said driver, and means for admitting compressed air to said piston so as to move said piston from said home position on a drive stroke to said driven position, whereby to drive a staple through said drive track into work, the improvement which comprises: releasable means to hold said piston in its home position until said means for admitting compressed air to said piston is actuated; an air storage chamber; air conduit means connecting said chamber with that end of said cylinder towards which said piston is driven on its drive stroke; valve means to permit air between said piston's home position and said piston's driven position, when said piston is in its home position, to escape to atmosphere, said valve means including means to prevent escape of air to atmosphere when said piston leaves its home position; and an additional port to introduce compressed air into said chamber when said piston is in its driven position; whereby, when said piston moving means is deactuated and said cylinder in the region of said releasable means is open to atmosphere, the air in said chamber returns said piston to said releasable means.

8. In a pneumatic stapler comprising a cylinder having an upper end and a lower end, a piston slidable in said cylinder, a staple drive track, a staple driver slidable in said staple drive track, said staple driver being attached to said piston, staple feed means for feeding a succession of staples into said staple drive track in position to be engaged by said staple driver, the improvement which comprises: holding means normally operative to maintain said piston at the upper end of said cylinder, means to introduce air at said upper end of said cylinder under sufficient pressure to overcome said holding means and drive said piston to the lower end of said cylinder whereby to drive said staple driver through said staple drive track to drive a staple into work, valve means including said staple driver which opens said lower end of said cylinder to atmosphere when said piston is maintained at said upper end of said cylinder by said holding means and which closes said lower end of said cylinder to atmosphere when said piston is moved away from said holding means towards said lower end of said cylinder by introduction of air under pressure at said upper end of said cylinder, an air storage chamber which communicates with said cylinder at its said lower end whereby air moved by said piston as it moves towards said lower end of said cylinder is forced into said chamber, additional means for introducing compressed air into said chamber when said piston is at said lower end of said cylinder, said air in said chamber being sufficient to return said piston to said holding means when air is no longer introduced under pressure at said upper end of said cylinder, and means to exhaust air moved by said piston as it is moved towards said holding means by the air from said chamber.

9. In a pneumatically operated device, a cylinder provided with a head, a piston slidable in said cylinder, releasable means operative independent of air pressure normally to hold said piston in a retracted position, travel limiting means for said piston, means for admitting air under pressure from a source to said cylinder so as to overcome said releasable means and drive said piston from said retracted position to said travel limiting means, a port in said cylinder adjacent said travel limiting means and disposed just below the surface of said piston when said piston has abutted said travel limiting means, a reservoir connected to said port, a second port connected to said reservoir and to a source of air under pressure, a valve for said second port for admitting air under pressure to said reservoir when said piston abuts said travel limiting means, the air under pressure in said reservoir acting upon the lower surface of said piston via said first mentioned port, and a passage from said cylinder for air beneath said piston when said piston is in its retracted position, said piston when seated on said limiting means acting to seal off said passage while air is admitted to said reservoir through said second port, whereby when air pressure is no longer admitted to said cylinder and said air pressure is diminished, the air under pressure in said reservoir causes said piston to return to retracted position where it is held independent of air pressure by said releasable means, excess air in said reservoir and cylinder exhausting through said passage.

10. The device of claim 9 in which said passage is more restricted than said first mentioned port whereby air moved by said piston, when said piston moves from its said retracted position to said travel limiting means, passes through said first mentioned port into said reservoir.

11. The device of claim 9 including means to substantially close said passage immediately after said piston moves from its said retracted position.

12. The device of claim 9 in which said second port connects said reservoir and said cylinder, said second port being positioned in said cylinder so that it is exposed to air under pressure in said cylinder when said piston abuts said travel limiting means and seals said passage and the whole lower end of said cylinder.

13. The device of claim 9 in which said releasable means comprises a magnet.

14. In a pneumatic stapling tool having a cylinder provided with a head, means for admitting air under pressure from a source of compressed air to said cylinder, a piston in said cylinder and a driver arranged to be actuated by said piston to travel in a driver slot to drive a staple, the improvement which comprises: a magnet to hold said piston in retracted position with a portion, at least, of the head of said piston exposed to compressed air admitted to said cylinder, means to admit compressed air to said cylinder sufficient to overcome said magnet and drive said piston, means to limit the travel of said piston in a staple driving direction, a first port in said cylinder adjacent said travel limiting means, a reservoir connected to said first port whereby air below said piston is forced into said reservoir during staple driving movement of said piston, a second port in said cylinder also communicating with said reservoir, said second port being disposed above the head of said piston when said piston has abutted said travel limiting means, whereby the compressed air in said cylinder above said piston then passes through said second port into said reservoir, and means to stop the flow of compressed air to said cylinder and to open said cylinder to atmosphere in the region of said magnet, whereby the compressed air in said reservoir passes through said first port and returns said piston to said magnet.

15. The tool of claim 14 in which said first port is disposed just below the lower surface of said piston when said piston has abutted said travel limiting means, a non-return valve for said second port, and a clearance opening the cylinder to atmosphere in the region of said travel limiting means, said clearance being more restricted than said first port and said clearance being blocked by said piston when it abuts said travel limiting means.

16. The tool of claim 15 in which said clearance is substantially blocked by said driver immediately after said piston leaves said magnet.

17. In a fluid-power operated device, a cylinder provided with a head, a piston slidable in said cylinder, a magnet to hold said piston in a retracted position, travel limiting means for said piston, means for admitting fluid under pressure from a source to said cylinder so as to overcome said magnet and drive said piston from said retracted position to said travel limiting means, a first port in said cylinder adjacent said travel limiting means, a reservoir connected to said first port whereby fluid moved by said piston when said piston is driven to said travel limiting means is forced into said reservoir, a second port connected to said reservoir and to a source of fluid under pressure, a valve for said second port for admitting fluid under pressure to said reservoir when said piston abuts said travel limiting means, the fluid under pressure in said reservoir acting upon the lower surface of said piston via said first port, and means to diminish the fluid pressure above said piston, whereby the fluid under pressure in said reservoir causes said piston to return to retracted position where it is held by said magnet.

18. The device of claim 17 in which said second port is located in said cylinder above said piston when said piston abuts said travel limiting means, said valve being a non-return valve, whereby the fluid under pressure admitted to said reservoir through said second port is that fluid which served to drive said piston from the retracted position to said travel limiting means.

*19. In a pneumatically operated device, a cylinder provided with a head, a piston slidable in said cylinder, releasable means operative independent of air pressure normally to hold said piston in a retracted position, travel limiting means for said piston, the surface of said travel limiting means which contacts said piston being less in area than said cylinder, means for admitting air under pressure from a source to said cylinder so as to overcome said releasable means and drive said piston from said retracted position to said travel limiting means, a port in said cylinder adjacent said travel limiting means and disposed just below the surface of said piston when said piston has abutted said travel limiting means, a reservoir connected to said port, a second port connected to said reservoir and to a source of air under pressure, a valve for said second port for admitting air under pressure to said reservoir when said piston abuts said travel limiting means, the air under pressure in said reservoir acting upon the lower surface of said piston via said first mentioned*

*port, and a passage from said cylinder for air beneath said piston when said piston is in its retracted position, said piston operative when seated on said limiting means by said air under pressure to effect a shut-off valve to said passage whereby said passage is sealed while air is admitted to said reservoir through said second port, whereby when air pressure is no longer admitted to said cylinder and said air pressure is diminished, the air under pressure in said reservoir causes said piston to return to retracted position where it is held independent of air pressure by said releasable means, excess air in said reservoir and cylinder exhausting through said passage.*

References Cited

The following references, cited by the Examiner, are of record in the patented file of this patent, or the original patent.

UNITED STATES PATENTS

| | | | |
|---|---|---|---|
| 1,014,639 | 1/1912 | Colwell. | |
| 1,465,770 | 8/1923 | Shaff | 91—5 |
| 2,682,052 | 6/1954 | Juilfs. | |
| 2,807,021 | 9/1957 | Chellis. | |

FOREIGN PATENTS

| | | |
|---|---|---|
| 1,025,349 | 9/1954 | Germany. |
| 1,043,974 | 5/1959 | Germany. |

GRANVILLE Y. CUSTER, Jr., *Primary Examiner.*